(12) United States Patent
Lesley

(10) Patent No.: US 10,510,091 B1
(45) Date of Patent: Dec. 17, 2019

(54) SYSTEMS, METHODS AND COMPUTER PROGRAM PRODUCTS FOR PROVIDING DIGITAL COUPONS TO USERS

(71) Applicant: INMAR CLEARING, INC., Winston-Salem, NC (US)

(72) Inventor: Katherine Lesley, Kernersville, NC (US)

(73) Assignee: INMAR CLEARING, INC., Winston-Salem, NC (US)

(*) Notice: Subject to any disclaimer, the term of this patent is extended or adjusted under 35 U.S.C. 154(b) by 110 days.

(21) Appl. No.: 14/188,270

(22) Filed: Feb. 24, 2014

(51) Int. Cl.
*G06Q 30/02* (2012.01)

(52) U.S. Cl.
CPC ..... *G06Q 30/0238* (2013.01); *G06Q 30/0224* (2013.01)

(58) Field of Classification Search
None
See application file for complete search history.

(56) References Cited

U.S. PATENT DOCUMENTS

| | | | |
|---|---|---|---|
| 8,179,563 B2 | 5/2012 | King et al. | |
| 8,489,452 B1* | 7/2013 | Warner | G06Q 30/0226 705/14.34 |
| 2005/0222904 A1* | 10/2005 | Cotten | G06Q 30/02 705/14.19 |
| 2008/0052169 A1 | 2/2008 | O'Shea et al. | |
| 2008/0319846 A1 | 12/2008 | Leming et al. | |
| 2010/0257020 A1* | 10/2010 | Bryant | G06Q 30/02 705/14.23 |
| 2010/0280873 A1 | 11/2010 | Bryant | |
| 2011/0191157 A1 | 8/2011 | Blackhurst et al. | |
| 2011/0246284 A1 | 10/2011 | Chaikin et al. | |
| 2012/0029994 A1 | 2/2012 | Barkan et al. | |
| 2012/0215611 A1 | 8/2012 | Korson et al. | |
| 2013/0080235 A1 | 3/2013 | Wolfe | |
| 2013/0117094 A1* | 5/2013 | Jones et al. | 705/14.35 |
| 2013/0185150 A1 | 7/2013 | Crum | |
| 2013/0304553 A1* | 11/2013 | Hertel | G06Q 30/02 705/14.23 |

(Continued)

OTHER PUBLICATIONS

Kelley, J. "Bargain hunters stack coupons to pile on savings", Dayton Daily News. Dayton, Ohio. Oct. 18, 2009 [Retrieved from ProQuest-Dialog on Aug. 17, 2015].*

*Primary Examiner* — Michael W Schmucker
*Assistant Examiner* — Bion A Shelden
(74) *Attorney, Agent, or Firm* — Allen, Dyer, Doppelt + Gilchrist, P.A.

(57) ABSTRACT

A method of providing digital coupons to a user includes comparing a first plurality of codes with a second plurality of codes to identify one or more matching codes. The first plurality of codes are associated with products offered at a discount by a retailer, and the second plurality of codes are associated with products having a manufacturer discount associated therewith. A listing of one or more products associated with the respective one or more matching codes is displayed along with a digital coupon for each respective product. Each digital coupon has a combined value of the retailer discount and the manufacturer discount, and each digital coupon is user-selectable for placement in a digital wallet. In response to user selection, a digital coupon is placed within the digital wallet and is available for redemption at a location of the retailer.

12 Claims, 12 Drawing Sheets

(56) References Cited

U.S. PATENT DOCUMENTS

| | | |
|---|---|---|
| 2014/0025466 A1 | 1/2014 | Bortolin et al. |
| 2014/0058823 A1* | 2/2014 | Ross .................. G06Q 30/0238 |
| | | 705/14.38 |
| 2014/0081720 A1* | 3/2014 | Wu ............................. 705/14.1 |
| 2014/0379450 A1* | 12/2014 | Barbieri ............. G06Q 30/0207 |
| | | 705/14.25 |

* cited by examiner

SYSTEMS, METHODS AND COMPUTER PROGRAM PRODUCTS FOR PROVIDING DIGITAL COUPONS TO USERS

FIELD OF THE INVENTION

The present invention relates generally to product promotion and, more particularly, to product promotion via coupons.

BACKGROUND

Coupons are used by retail and other businesses to attract customers to their stores and to entice customers to purchase particular products and services. Typically, a coupon offers a discount on a product or service, or offers an additional discount on the same or similar item, provided that a designated item is purchased first. There are many conventional types of couponing methods, the most popular perhaps being printed coupons that are provided through various media, such as newspapers and magazines. Another popular couponing method is the bulk mailing of coupons from multiple merchants/businesses via a common sender. Yet another popular couponing method involves electronic or digital coupons, which are available via web sites or via distribution to electronic devices such as mobile phones. For example, mobile phone users may view and download digital coupons, and then redeem these digital coupons either at a physical store or online. Unfortunately, even with the various couponing methods now available, consumers find searching for coupons to be cumbersome and time consuming.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Embodiments of the present invention provide methods, systems, and computer program products that provide digital coupons to consumers based on combined retailer and manufacturer offers. For example, according to some embodiments of the present invention, a method of providing digital coupons to a user includes comparing a first plurality of codes (e.g., universal product codes (UPCs)) with a second plurality of codes (e.g., UPCs) to identify one or more matching codes, wherein the first plurality of codes are associated with products offered at a discount by a retailer (or to be offered by the retailer at a future time or time period), and wherein the second plurality of codes are associated with products having a manufacturer discount associated therewith, and then displaying a listing of one or more products associated with the respective one or more matching codes along with a digital coupon for each respective product. Each digital coupon has a combined value of the retailer discount and the manufacturer discount, and each digital coupon is user-selectable for placement in a digital wallet. In response to user selection ("clipping"), a digital coupon is placed within the digital wallet and is available for redemption at a retailer location.

In some embodiments, the first plurality of codes are acquired from the retailer prior to comparing the first plurality of codes with the second plurality of codes. In some embodiments, the first plurality of codes are acquired from one or more publications associated with the retailer prior to comparing the first plurality of codes with the second plurality of codes.

In some embodiments, comparing a first plurality of codes with a second plurality of codes to identify one or more matching codes is based on product and/or retailer preferences set by the user.

According to other embodiments of the present invention, a method of providing digital coupons to a user includes comparing a first plurality of codes (e.g., UPCs) with a second plurality of codes (e.g., UPCs) to identify one or more matching codes, wherein the first plurality of codes are associated with products offered at a discount by a retailer (or to be offered by the retailer at a future time or time period), and wherein the second plurality of codes are associated with products having a manufacturer discount associated therewith, and then automatically placing ("auto-clipping") a digital coupon in a digital wallet for the user for each product associated with the respective one or more matching codes. Each digital coupon has a combined value of the retailer discount and the manufacturer discount.

In some embodiments, the first plurality of codes are acquired from the retailer prior to comparing the first plurality of codes with the second plurality of codes. In some embodiments, the first plurality of codes are acquired from one or more publications associated with the retailer prior to comparing the first plurality of codes with the second plurality of codes.

In some embodiments, comparing a first plurality of codes with a second plurality of codes to identify one or more matching codes is based on product and/or retailer preferences set by the user.

According to other embodiments of the present invention, a system that provides digital coupons to users includes a processor, and a memory that stores instructions that, when executed by the processor, cause the processor to compare a first plurality of codes (e.g., UPCs) with a second plurality of codes (e.g., UPCs) to identify one or more matching codes, wherein the first plurality of codes are associated with products offered at a discount by a retailer (or to be offered by the retailer at a future time or time period), and wherein the second plurality of codes are associated with products having a manufacturer discount associated therewith, and display a listing of one or more products associated with the respective one or more matching codes along with a digital coupon for each respective product. Each digital coupon has a combined value of the retailer discount and the manufacturer discount, and each digital coupon is user-selectable for placement in a digital wallet. In response to user selection, a digital coupon is placed within the digital wallet and is available for redemption at a retailer location.

In some embodiments, the memory also stores instructions that, when executed by the processor, cause the processor to, prior to comparing the first plurality of codes with the second plurality of codes, acquire the first plurality of codes from the retailer. In some embodiments, the memory stores instructions that, when executed by the processor, cause the processor to, prior to comparing the first plurality of codes with the second plurality of codes, acquire the first plurality of codes from one or more publications associated with the retailer.

In some embodiments, the memory also stores instructions that, when executed by the processor, cause the processor to compare a first plurality of codes with a second plurality of codes to identify one or more matching codes based on product and/or retailer preferences set by the user.

According to other embodiments of the present invention, a system that provides digital coupons to users includes a processor, and a memory that stores instructions that, when executed by the processor, cause the processor to compare a first plurality of codes (e.g., UPCs) with a second plurality of codes (e.g., UPCs) to identify one or more matching codes, wherein the first plurality of codes are associated with products offered at a discount by a retailer (or to be offered by the retailer at a future time or time period), and wherein the second plurality of codes are associated with products having a manufacturer discount associated therewith, and then automatically place ("auto-clip") a digital coupon in a digital wallet for the user for each product associated with the respective one or more matching codes. Each digital coupon has a combined value of the retailer discount and the manufacturer discount.

In some embodiments, the memory also stores instructions that, when executed by the processor, cause the processor to, prior to comparing the first plurality of codes with the second plurality of codes, acquire the first plurality of codes from the retailer. In some embodiments, the memory stores instructions that, when executed by the processor, cause the processor to, prior to comparing the first plurality of codes with the second plurality of codes, acquire the first plurality of codes from one or more publications associated with the retailer.

In some embodiments, the memory also stores instructions that, when executed by the processor, cause the processor to compare a first plurality of codes with a second plurality of codes to identify one or more matching codes based on product and/or retailer preferences set by the user.

According to other embodiments of the present invention, a computer program product, includes a non-transitory computer readable storage medium having encoded thereon instructions that, when executed on a processor, cause the processor to perform operations including comparing a first plurality of codes (e.g., UPCs) with a second plurality of codes (e.g., UPCs) to identify one or more matching codes, wherein the first plurality of codes are associated with products offered at a discount by a retailer (or to be offered by the retailer at a future time or time period), and wherein the second plurality of codes are associated with products having a manufacturer discount associated therewith, and displaying a listing of one or more products associated with the respective one or more matching codes along with a digital coupon for each respective product. Each digital coupon has a combined value of the retailer discount and the manufacturer discount, and each digital coupon is user-selectable for placement in a digital wallet. In response to user selection, a digital coupon is placed within the digital wallet and is available for redemption at a retailer location.

In some embodiments, the first plurality of codes are acquired from the retailer prior to comparing the first plurality of codes with the second plurality of codes. In some embodiments, the first plurality of codes are acquired from one or more publications associated with the retailer prior to comparing the first plurality of codes with the second plurality of codes.

In some embodiments, comparing a first plurality of codes with a second plurality of codes to identify one or more matching codes is based on product and/or retailer preferences set by the user.

According to other embodiments of the present invention, a method of providing digital coupons to a user includes comparing a first plurality of codes (e.g., UPCs) with a second plurality of codes (e.g., UPCs) to identify one or more matching codes, wherein the first plurality of codes are associated with products offered at a discount by a retailer (or to be offered by the retailer at a future time or time period), and wherein the second plurality of codes are associated with products having a manufacturer discount associated therewith, and then automatically placing ("auto-clipping") a digital coupon in a digital wallet for the user for each product associated with the respective one or more matching codes. Each digital coupon has a combined value of the retailer discount and the manufacturer discount.

In some embodiments, the first plurality of codes are acquired from the retailer prior to comparing the first plurality of codes with the second plurality of codes. In some embodiments, the first plurality of codes are acquired from one or more publications associated with the retailer prior to comparing the first plurality of codes with the second plurality of codes.

In some embodiments, comparing a first plurality of codes with a second plurality of codes to identify one or more matching codes is based on product and/or retailer preferences set by the user.

Embodiments of the present invention are advantageous because the effort and time required by users to find and clip coupons can be reduced. Moreover, embodiments of the present invention identify coupon "stacking" opportunities for consumers, further reducing the time and effort of consumers in finding such offers. As such, embodiments of the present invention may lead to greater retailer and/or manufacturer loyalty and may lead to higher digital coupon consumption.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

FIGS. 7A-7C are exemplary user interfaces displayed within a web browser by a B2C system for providing digital coupons to consumers, according to some embodiments of the present invention.

DETAILED DESCRIPTION

Figure 1:
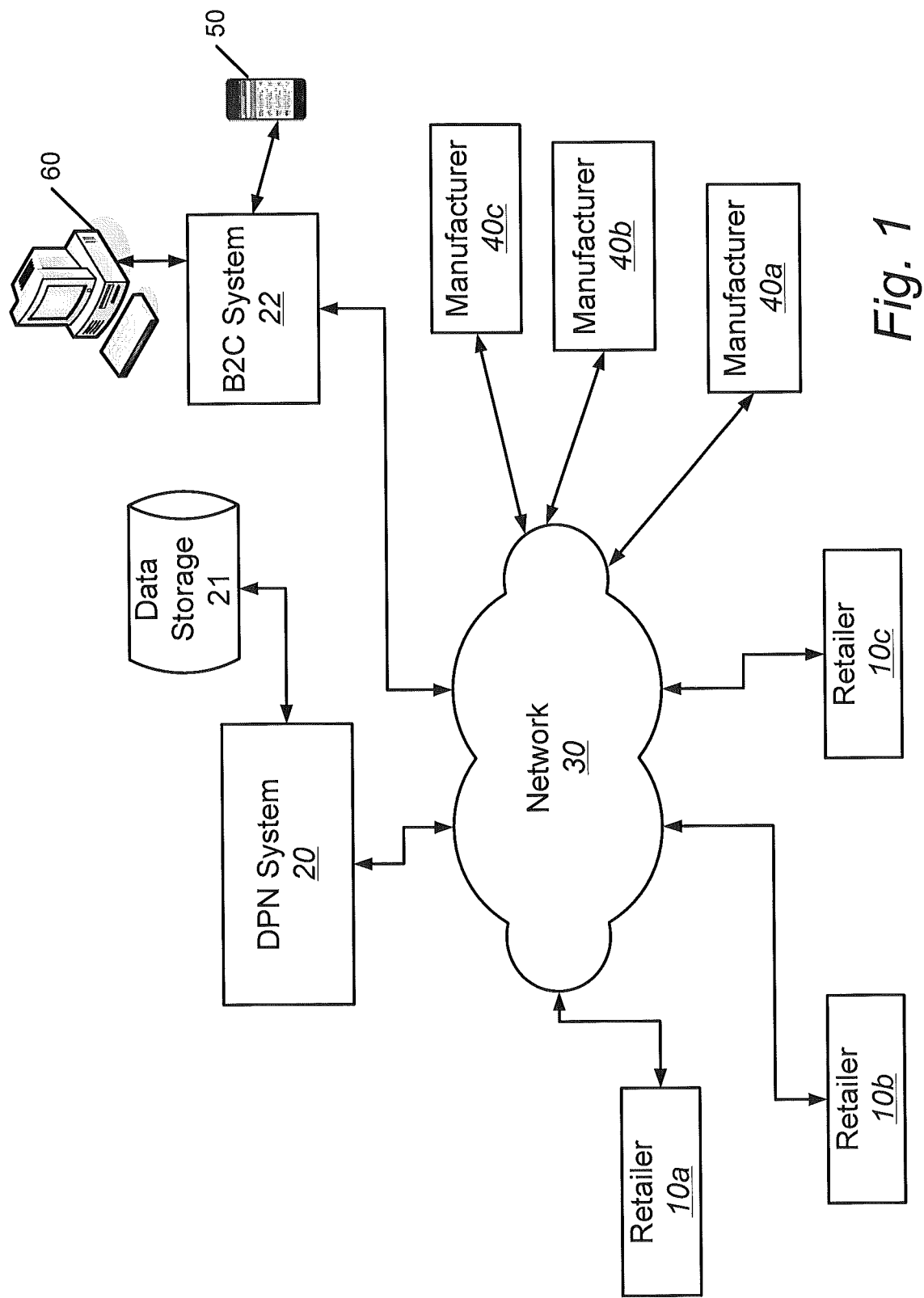
FIG. 1 is a block diagram of systems, methods and computer program products for providing digital coupons to consumers, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary by +/− twenty percent (20%).

The terms "consumer" and "user", as used herein, are interchangeable and refer to a person who clips coupons (both physical coupons and digital coupons) and redeems clipped coupons as described herein.

The term "digital wallet", as used herein, refers to an electronic interface that displays digital coupons that have been clipped by and/or for a user associated with the digital wallet. When a user clips a digital coupon (and when the DPN system auto-clips a digital coupon), the coupon is placed in the user's digital wallet. A user may view his/her digital wallet via a mobile device, such as a smart phone, and via a computing device, such as a desktop computer, etc.

The terms "offers", "coupons", "electronic coupons", and "digital coupons", as used herein, are interchangeable and refer to discounts associated with goods/services offered for sale and that can be redeemed at a point of sale (POS).

The term "product", as used herein, refers to goods and services offered for sale, for example, by merchants such as retailers.

The terms "product promotion information", "product sales information", and "promotions", as used herein, are interchangeable and refer to information about offers, discounts, etc., associated with goods/services offered for sale.

The term "retailer", as used herein refers to any entity that sells goods and/or services and where coupons can be used by consumers when purchasing these goods/services.

The terms "stacking" and "coupon stacking", as used herein, are interchangeable and refer to combining a product manufacturer's coupon with a retailer's coupon to reduce the price of a product or service.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

FIG. 1 is a block diagram of systems, methods and computer program products for providing digital offers or coupons to consumers according to some embodiments of the present invention. Exemplary retailers 10a, 10b, and 10C are shown connected to a Digital Promotions Network (DPN) system 20 via a communications network 30, such as the Internet. The retailers 10a, 10b, 10c use the DPN system 20 to manage customer loyalty programs, to generate offers/promotions, to handle the redemption of coupons and rewards, and to track/analyze the behavior of consumers (e.g., purchases made by consumers). The illustrated retailers 10a, 10b, 10c are not limited to particular types of stores or to particular types of goods or services, but are intended to include all sellers of goods and/or services that may utilize and/or be utilized in accordance with embodiments of the present invention. Exemplary retailers 10a, 10b, 10c may include, for example, grocery stores, department stores, "big box" discount stores, etc. However, various other merchants are intended to be included, as well.

The network 30 may be a global network, such as the Internet or other publicly accessible network. Various elements of the network 30 may be interconnected by a wide area network, a local area network, an Intranet, and/or other private network, which may not be accessible by the general public. Thus, the communication network 30 may represent a combination of public and private networks or a virtual private network (VPN). The network 30 may be a wireless network, a wireline network, or may be a combination of both wireless and wireline networks.

The DPN system 20 illustrated in FIG. 1 is configured to obtain product manufacturer promotion/sales information as well as retailer promotion/sales information and deliver this information to consumers who have registered to receive or have access to such information. This includes access to digital coupons that can be clipped by consumers (or automatically clipped for consumers) for redemption at a retailer. The product manufacturer promotion/sales information and retailer promotion/sales information, including digital coupons offered by manufacturers and retailers, may be stored in one or more databases, represented by data storage 21. As will be described in detail below, the DPN system 20 also is configured to review past purchases made by consumers and to present currently available digital coupons that the consumer can clip and then redeem at a retailer.

The B2C (business to consumer) system 22 illustrated in FIG. 1 operates in conjunction with the DPN system 20 and includes an interface that displays coupons to consumers, for example, via a web browser of a mobile device 50 or desktop computer 60. There may be multiple B2C systems 22; however, only one is illustrated in FIG. 1 for clarity. It is understood that each retailer (10-10c) may include their own B2C system 22, customized to their own brand and/or needs, or one or more third parties may provide one or more B2C systems 22. Each B2C system 22 communicates with the DPN system 20 and the DPN system 20 provides the digital coupons that are displayed via a B2C system 22.

Figure 7A:
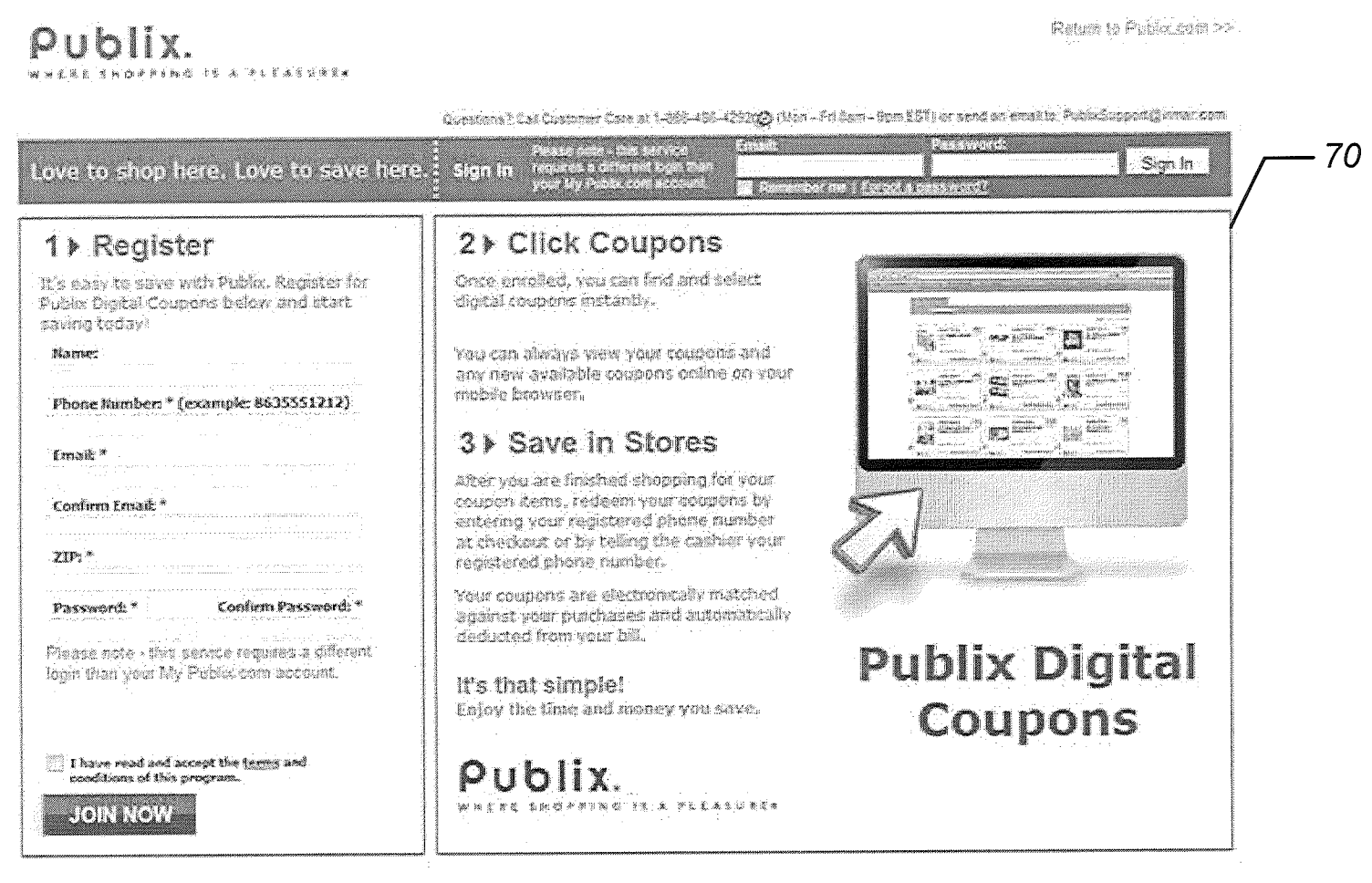
Figure 7B:
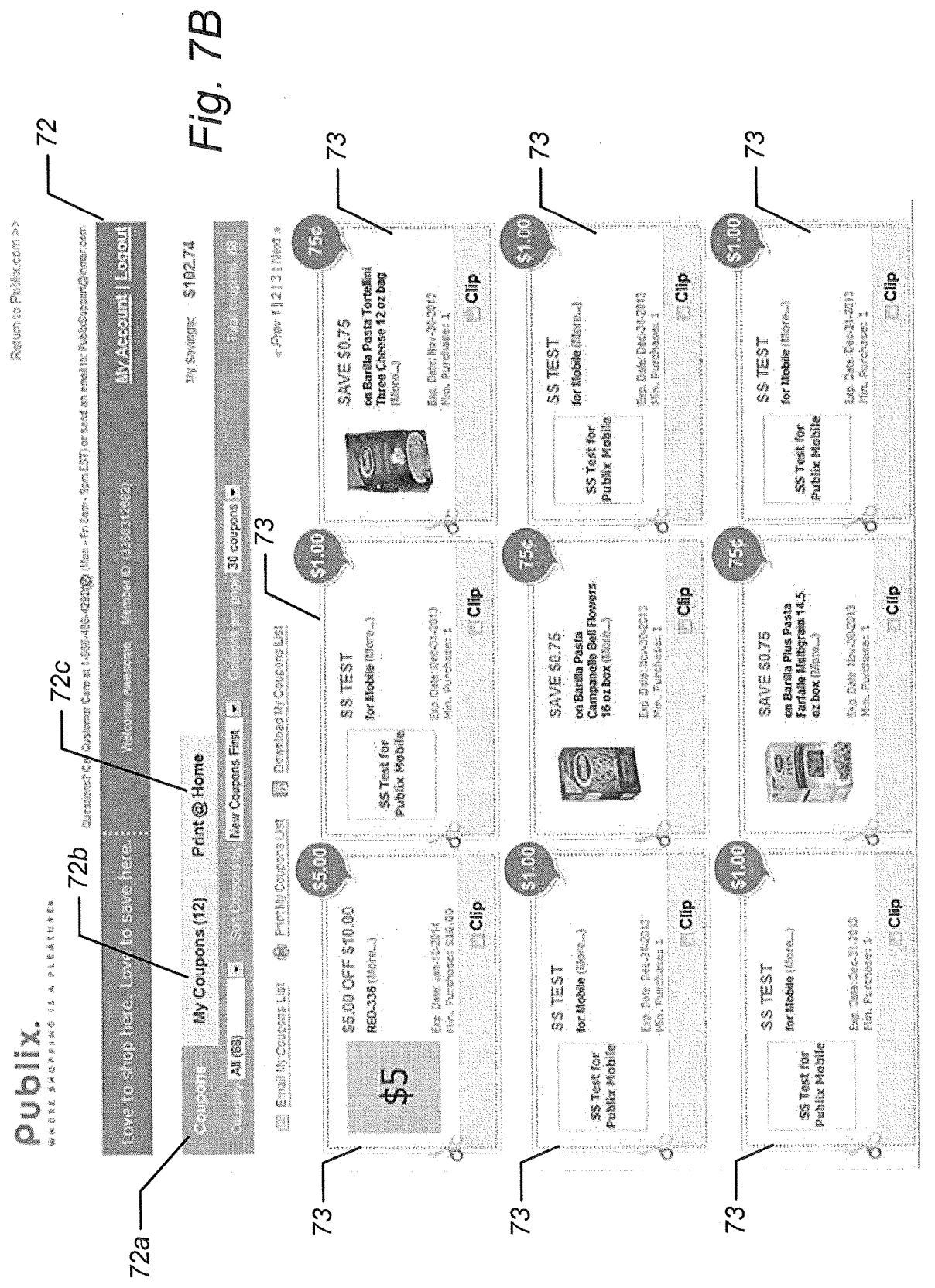

FIG. 7A illustrates an exemplary user interface 70 displayed by a B2C system 22 within the web browser of a consumer device 50, 60 prior to the consumer logging in to the B2C system. Once the consumer logs in, FIG. 7B illustrates an exemplary user interface 72 that is displayed by the B2C system 22 within the web browser of a consumer device 50, 60. User interface 72 includes three user-selectable tabs: "Coupons" 72a, "My Coupons" 72b, and "Print@Home" 72c. In FIG. 7B, the "Coupons" tab 72a is selected and all available digital coupons 73 for a particular retailer (e.g., 10a-10c) that the consumer can select may be displayed, whether these are for products the consumer is interested in or not. Alternatively, the coupons 73 displayed in FIG. 7B may be coupons for products purchased in the past by the consumer, in accordance with some embodiments of the present invention.

Via user interface 72, a user can select or "clip" digital coupons 73 which are then placed in a digital wallet or "eWallet" associated with the consumer. The digital wallet is maintained by the DPN system 20 and is accessed by a retailer at a POS for coupon redemption by a consumer. A consumer can access and view his/her digital wallet via a user device, such as mobile device 50, desktop computer 60, etc.

Figure 8:
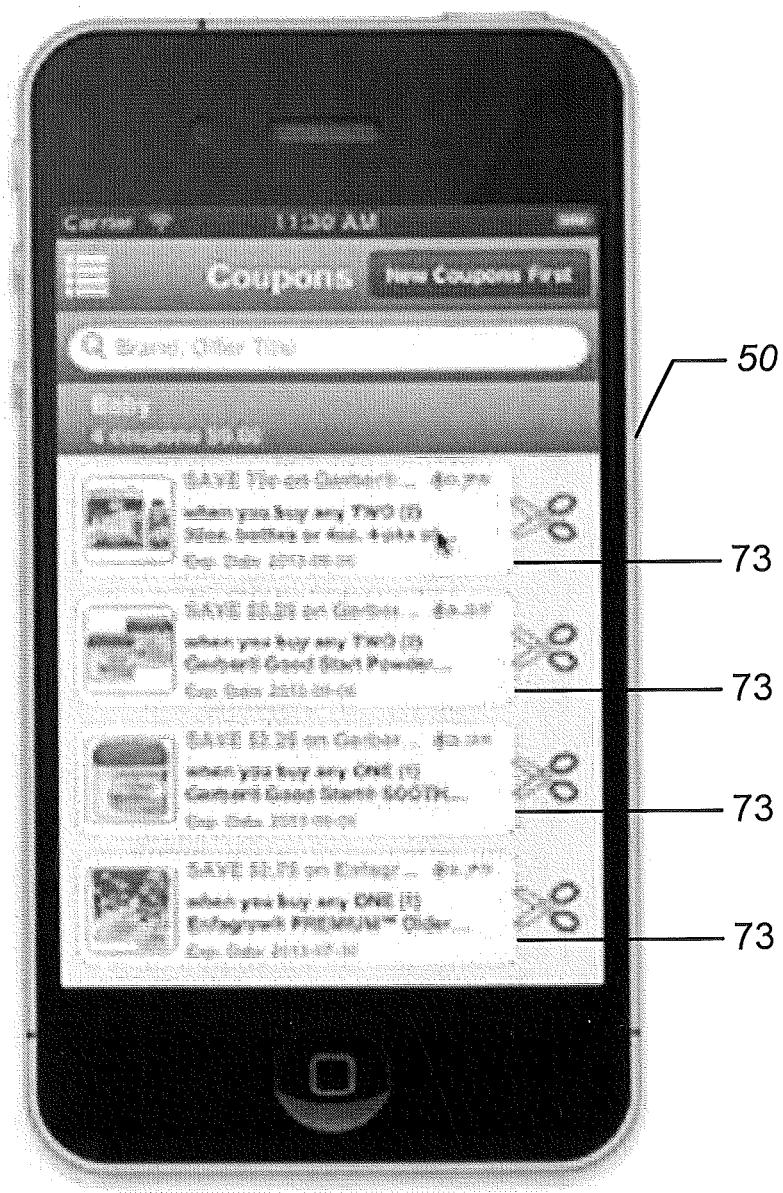
FIG. 8 illustrates a mobile device of a consumer displaying clipped digital coupons within a digital wallet, according to some embodiments of the present invention.

FIG. 8 illustrates a mobile device 50 displaying digital coupons 73 within a digital wallet. The digital coupons 73 within a digital wallet, such as illustrated in FIG. 8, may include digital coupons clipped by a consumer and digital coupons "auto-clipped" by the DPN system 20 based upon past purchases of the consumer, as described below.

The "Print@Home" tab 72C illustrated in FIG. 7B, when selected by a user, allows the user to print out coupons. These physical coupons can be redeemed when the user visits a retailer.

Figure 7C:
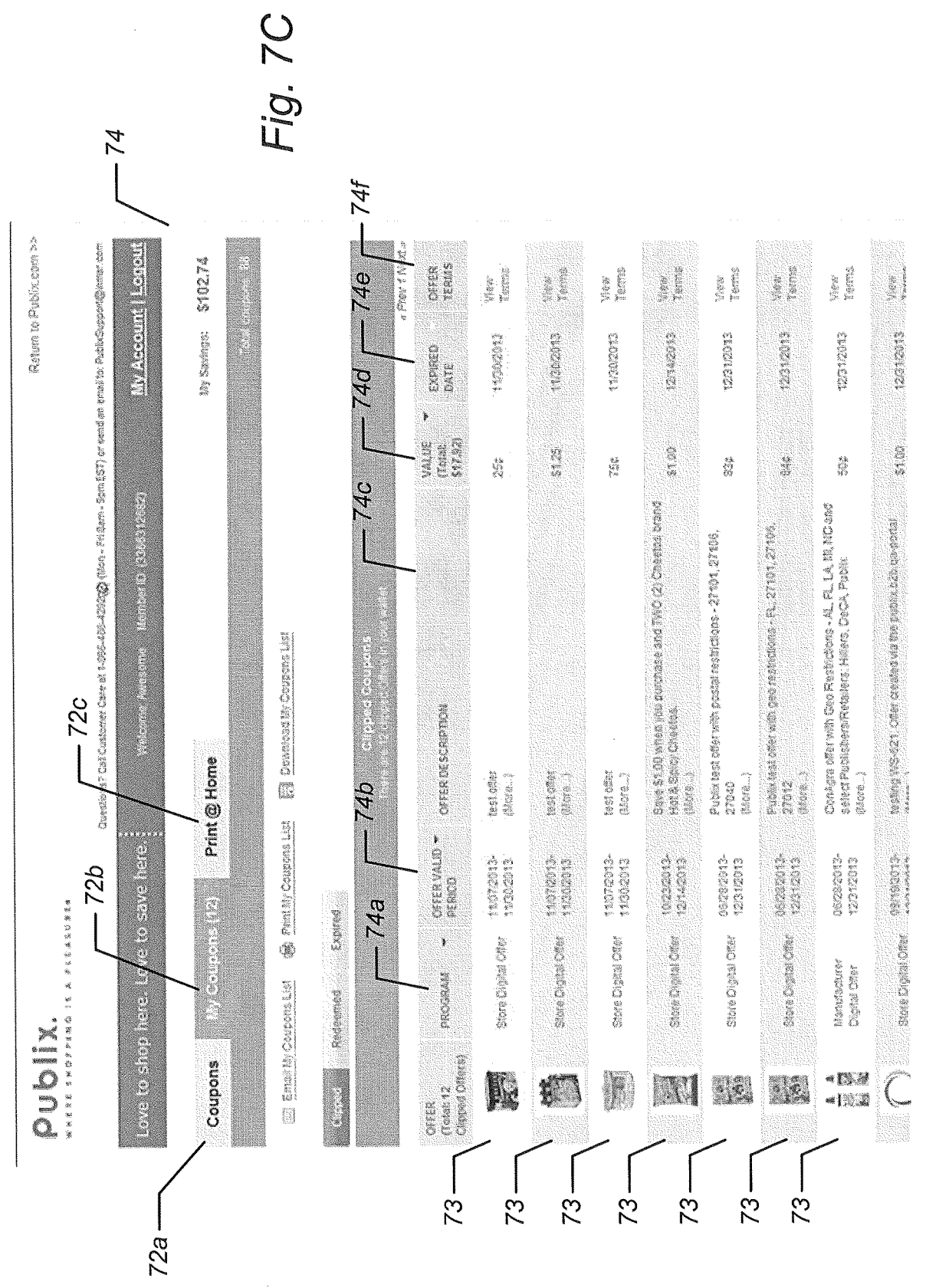

In FIG. 7C, the "My Coupons" tab 72b is selected and user interface 74 is displayed. The coupons 73 displayed within user interface 74 are coupons that have been clipped by a user and/or by the DPN system 20 for the user based on past purchases of the user. For each coupon 73 in the user interface 74, various information is displayed including, program 74a (i.e., whether the coupon is a retailer's coupon or a manufacturer's coupon), offer valid period 74b, offer description 74c, offer value 74d, expiration date of offer 74e, and terms 74f.

When a user clips a digital coupon 73 from user interface 72 in FIG. 7B (or when the DPN system 20 clips a coupon for the user), the coupon 73 is placed in a digital wallet and is immediately available for redemption at a retailer. For example, a user enters a retailer to purchase a product. When the product is checked out at the point of sale (POS) system, the universal product code (UPC) of the product (also referred to as a "bar code") is scanned and recognized by the POS system. The cashier then obtains the consumer's loyalty card id (e.g., number, etc.) and enters it into the POS system. The POS system then sends both the loyalty card number and the product UPC to the DPN system 20 (FIG. 1). The DPN system 20 checks to see if this consumer has clipped a coupon for the particular product. If the consumer has clipped a coupon for the product, the DPN system 20 sends a message back to the POS system with the savings information. For example, if the coupon is for $0.25, the consumer receives $0.25 off the price of the product and this is reflected on the receipt issued by the POS system.

Figure 2:
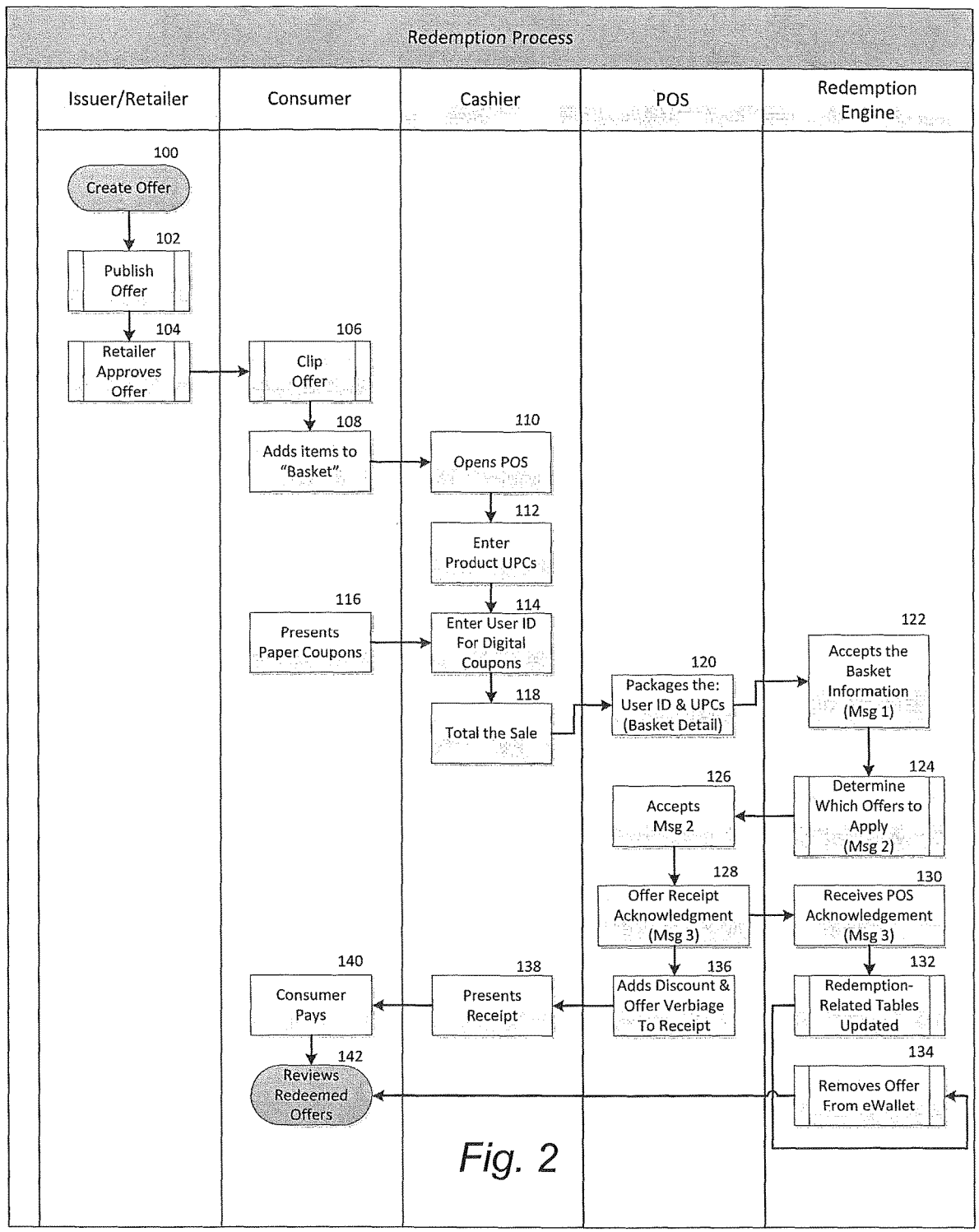
FIG. 2 is a flowchart of operations for coupon creation, clipping, and redemption.

Referring now to FIG. 2, the process of coupon creation, clipping, and redemption will be briefly described. Initially, an offer (i.e., a digital coupon) is created for a product (Block 100), published (Block 102), for example, via the DPN system (20, FIG. 1), and then approved by a retailer selling the product (Block 104). Once approved, the offer is available to consumers via a B2C system, such as B2C system 22 (FIG. 1). A consumer looking for digital coupons accesses a B2C system, such as B2C system 22 (FIG. 1), and clips the digital coupon representative of the offer (Block 106). As described above, the clipped digital coupon is placed in the consumer's digital wallet and is immediately available for use at a retailer.

A clipped coupon is used when the consumer visits a retailer and purchases a product corresponding to the coupon. For example, the consumer places a product in a shopping basket (Block 108) and proceeds to checkout. At the retailer's point of sale (Block 110), the cashier enters the UPC for the product into the POS system (Block 112) and enters a user ID for the consumer, for example, by scanning the consumer's loyalty card, by entering a telephone number, etc. (Block 114). The consumer may also present one or more paper coupons to the cashier for the product or for other products being purchased (Block 116) and this information is entered into the POS system, for example, by scanning UPCs associated with the paper coupons. The POS system then totals the sale for product purchases (Block 118).

The POS system combines or "packages" the consumer ID information and UPC information from the digital coupon and any paper coupons and forwards this information to the DPN system 20 (Block 122). The DPN system 20 acknowledges receipt of the information from the POS system (Block 122) and determines which coupons will apply to products being purchased by the consumer (Block 124). The DPN system 20 sends a message back to the POS system with information regarding which coupons will be accepted (Block 126). The retailer's POS system then acknowledges receipt of this information to the DPN system 20 (Block 128), adds the discount(s) represented by the coupon(s) presented by the customer (both digital coupons and paper coupons), and prepares a description of the discounts applied for printing on the consumer's receipt (Block 136). The cashier presents the receipt to the customer (Block 138), the consumer pays the cashier for the purchase (Block 140), and may review the redeemed offer(s) (Block 142). When the DPN system 20 receives the POS system's acknowledgement (Block 130), the DPN system 20 updates redemption-related tables (Block 132) and removes the redeemed digital coupon(s) from the consumer's digital wallet (Block 134).

Figure 3:
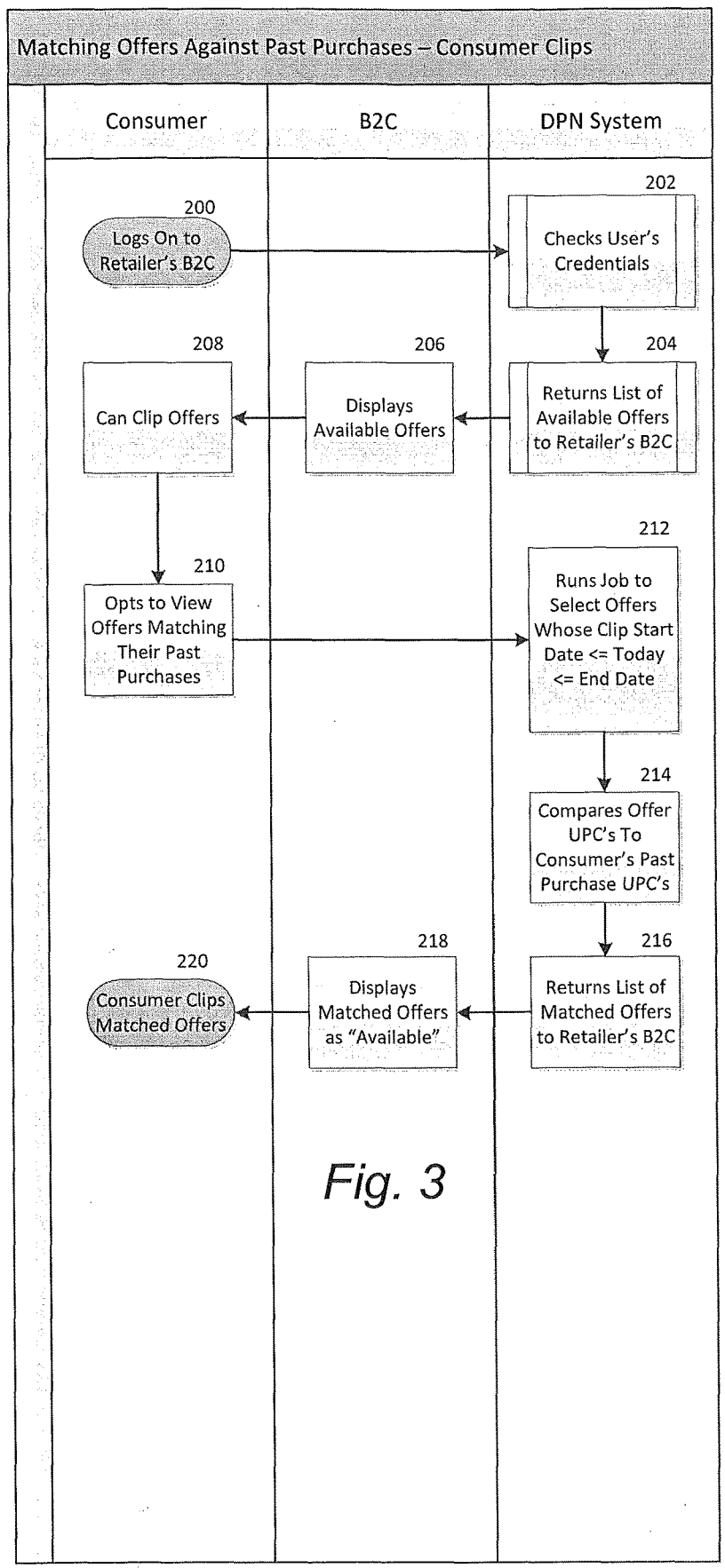
FIGS. 3, 4A-4B, 5, and 6A-6B are flowcharts of operations for providing digital coupons to consumers, according to some embodiments of the present invention.

Referring now to FIG. 3, operations for matching offers against past purchases of consumers, according to some embodiments of the present invention, are illustrated. In the illustrated embodiment, a consumer logs on to a B2C system (e.g., 22, FIG. 1) of a retailer (Block 200), for example, via a mobile device 50 and/or via another computing device 60, such as a desktop computer. The DPN system 20 in communication with the B2C system 22 checks the consumer's credentials (Block 202) and, if the consumer's credentials are valid, the DPN system 20 returns a list of available offers to the B2C system 22 (Block 204) which then displays these offers to the consumer (Block 206). The consumer may then clip digital coupons from the displayed offers (Block 208) and can request that coupons matching past purchases of the consumer be displayed (Block 210). The DPN system 20 executes a program to select offers having a clip start date of the present day or earlier and an end date (i.e., an expiration date) of some predetermined date (Block 212). In other words, the DPN system 20 selects offers that are active and available for clipping by a user.

Once the DPN system 20 has selected active offers, for example, that satisfy the date range of Block 212, the DPN system 20 compares the UPCs of these existing offers with UPCs recorded for the consumer's past purchases (Block 214). The DPN system 20 then knows what products the consumer has purchased in the past and that currently have coupons the consumer can use. The DPN system 20 returns a list of these "matched" offers (i.e., current offers that match past purchases of the consumer) to the retailer's B2C system (Block 216) and the B2C system displays them to the consumer (Block 218), for example, via user interface 72 of FIG. 7B. The consumer can then clip digital coupons (73, FIG. 7B) for these matched offers (Block 220) for future redemption at the retailer. Clipped coupons are added to the consumer's digital wallet.

Figure 4:
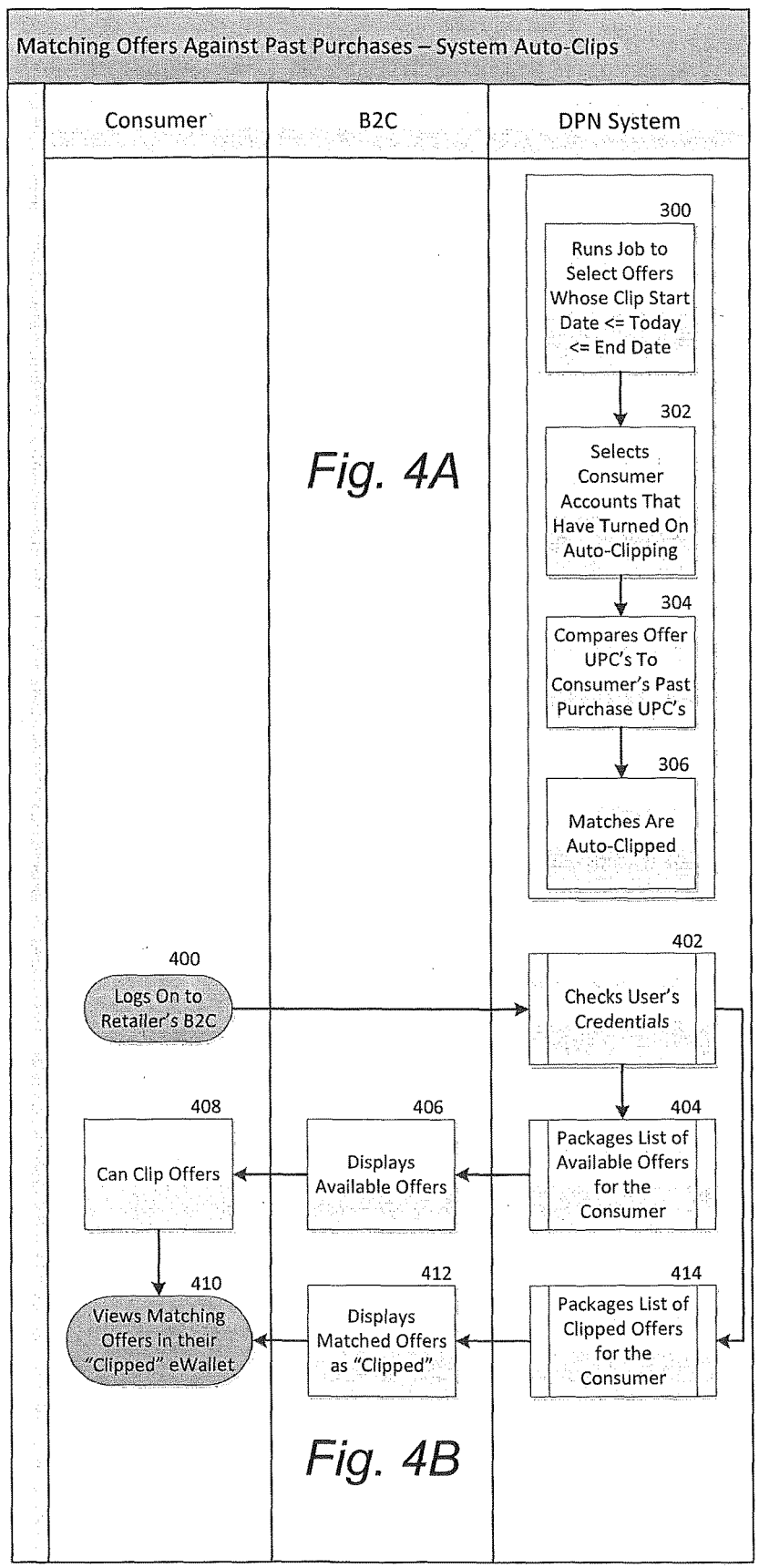

Referring now to FIGS. 4A and 4B, operations for matching offers against past purchases of consumers, according to some embodiments of the present invention, are illustrated. In the illustrated embodiment, the DPN system 20 is configured to automatically clip digital coupons (73, FIG. 7B) for registered consumers based on their past purchases. For example, for each consumer that is registered with the DPN system 20, the DPN system 20 periodically executes a program to select offers having a clip start date of the present day or earlier and an end date of some predetermined date (i.e., coupons that are active) (Block 300), as described above with respect to Block 212 of FIG. 3. The DPN system 20 selects the accounts of registered consumers who have activated "auto-clipping" of digital coupons (Block 302). For each such consumer, the DPN system 20 compares the UPCs of currently existing offers (e.g., both retailer coupons and product manufacturer coupons) with UPCs recorded for the consumer's past purchases (Block 304). The DPN system 20 then "auto-clips" matching digital coupons for each consumer and places them in the consumer's digital wallet (Block 306). These clipped digital coupons are available for use by the consumer when the consumer visits a retailer.

Operations for when a consumer, who has activated "auto-clipping" of digital coupons, logs on to a B2C system 22 are illustrated in FIG. 4B. A consumer logs on to a B2C system 22 of a retailer (Block 400), for example, via a mobile device 50 and/or via another computing device 60, such as a desktop computer. The DPN system 20 in communication with the B2C system 22 checks the consumer's credentials (Block 402) and, if the consumer's credentials are valid, the DPN system 20 returns a list of available offers to the B2C system 22 (Block 404) which then displays these offers to the consumer (Block 406). The consumer may then clip digital coupons from the displayed offers (Block 408).

The DPN system 20 also returns a list of "auto-clipped" offers that are in the consumer's digital wallet to the B2C system (Block 414) which then displays these offers to the consumer (Block 412). The consumer can view these "auto-clipped" digital coupons along with any additional digital coupons the consumer has clipped (Block 410). These clipped digital coupons in the consumer's digital wallet are available for use by the consumer when the consumer visits a retailer.

Figure 5:
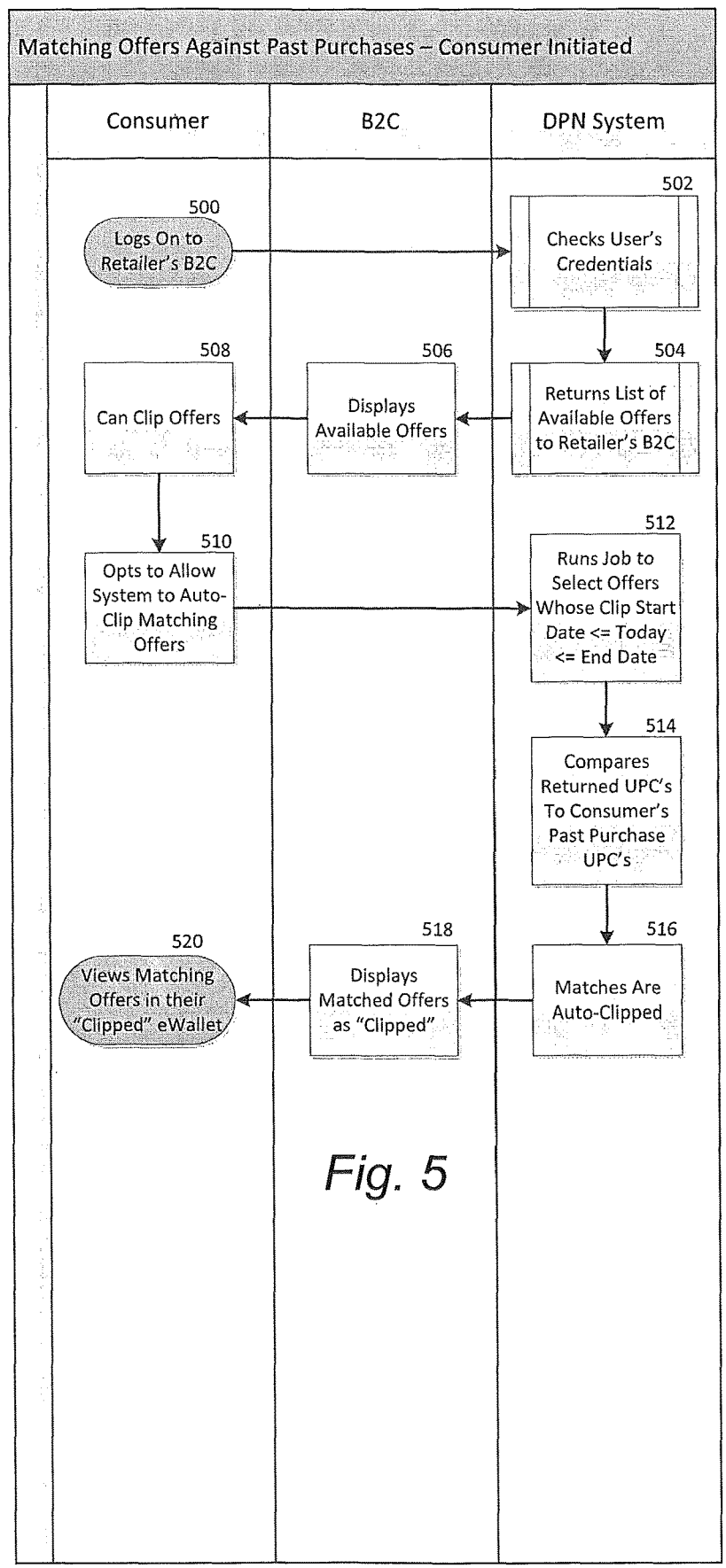

Referring now to FIG. 5, operations for matching offers against past purchases of consumers, according to some embodiments of the present invention, are illustrated. In the illustrated embodiment, the consumer is given the option of initiating the auto-clipping feature described above with respect to FIGS. 4A-4B. A consumer logs on to a B2C system 22 associated with a retailer (Block 500), for example, via a mobile device 50 and/or via another computing device 60, such as a desktop computer. The DPN system 20 in communication with the B2C system 22 checks the consumer's credentials (Block 502) and, if the consumer's credentials are valid, the DPN system 20 returns a list of available offers to the B2C system 22 (Block 504) which then displays these offers to the consumer (Block 506). The consumer may then clip digital coupons from the displayed offers (Block 508). In addition, the consumer can initiate auto-clipping by the DPN system 20 via the B2C system 22 (Block 510).

Once auto-clipping is initiated, the DPN system 20 executes a program to select offers having a clip start date of the present day or earlier and an end date of some predetermined date (i.e., the DPN system 20 selects active coupons) (Block 512). Once the DPN system 20 has selected existing, active offers, for example, coupons that satisfy the date range of Block 512, the DPN system 20 compares the UPCs of these existing offers with UPCs recorded for the consumer's past purchases (Block 514). The DPN system 20 then knows what products the consumer has purchased in the past and that currently have coupons the consumer can use. The DPN system 20 then "auto-clips" any digital coupons that match the consumer's past purchases and places these auto-clipped digital coupons in the consumer's digital wallet (Block 516). The DPN system 20 returns a list of the "auto-clipped" digital coupons that are in the consumer's digital wallet to the B2C system (Block 518). The consumer can view these "auto-clipped" digital coupons along with any additional digital coupons the consumer has clipped, for example, as illustrated in FIG. 8 (Block 520). These clipped digital coupons in the consumer's digital wallet are available for use by the consumer when the consumer visits a retailer.

According to some embodiments of the present invention, a consumer can set various preferences regarding auto-clipping and regarding matching currently available digital coupons with past purchases. For example, a consumer can specify that the DPN system 20 match existing digital coupons with past purchases with respect to product categories, product types, and/or product brands. A consumer can specify that the DPN system 20 match existing digital coupons with past purchases made at specific retailers and/or at specific retailer locations. For example, a grocery retailer may have several locations within a particular city. The consumer may only want the DPN system 20 to match existing digital coupons with past purchases at a particular store. In addition, a consumer can specify that the DPN system 20 match existing digital coupons with past purchases that occurred within one or more specific time periods. The DPN system 20 stores the various consumer preferences, for example, in data storage 21 (FIG. 1).

Figure 6A:
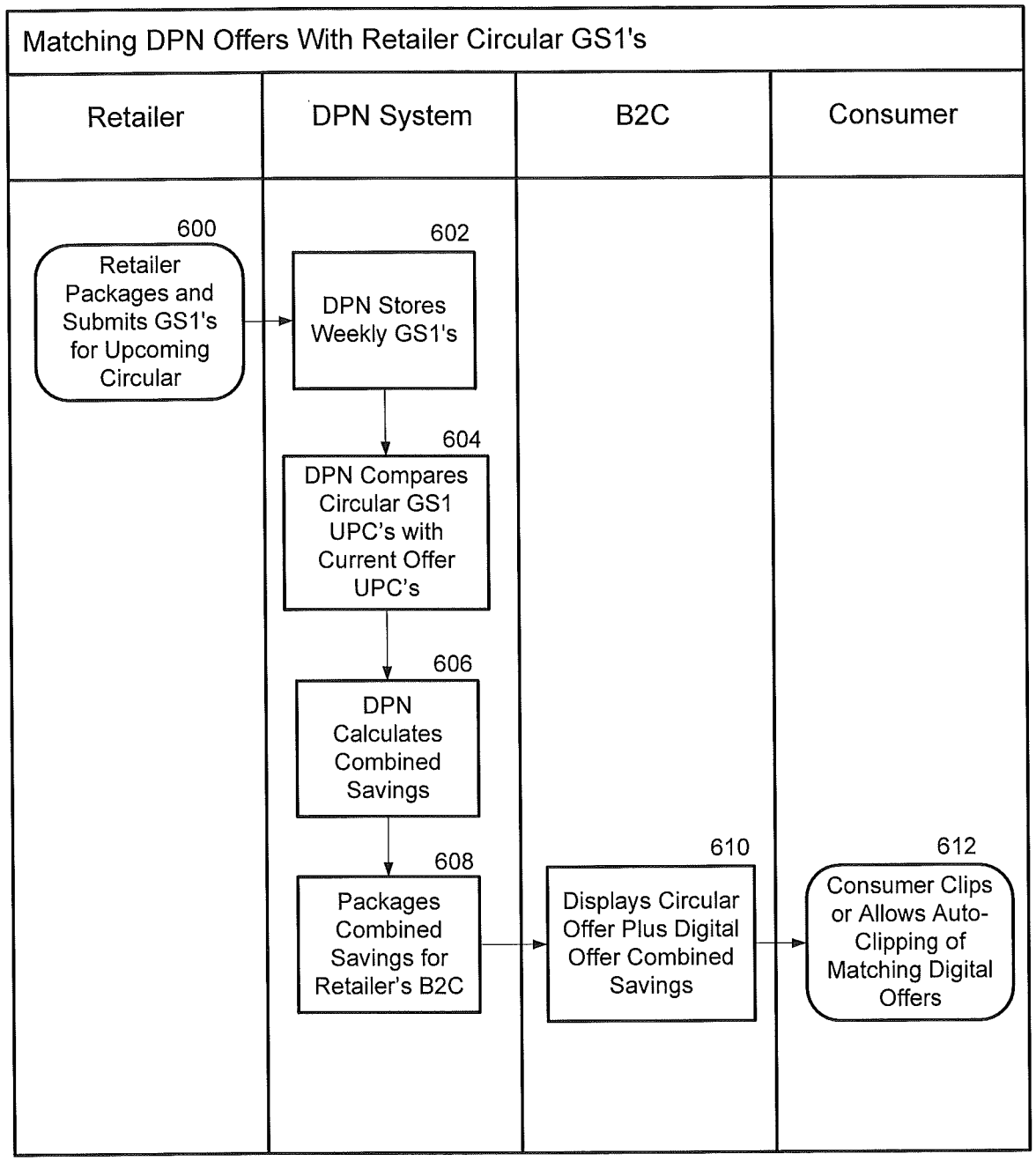

Referring now to FIG. 6A, operations for identifying coupon stacking opportunities and for providing digital coupons to consumers representative of these stacking opportunities, according to some embodiments of the present invention, are illustrated. A retailer packages and submits a plurality of GS1's for publication in an upcoming circular (Block 600). A GS1 is a 70-digit barcode that tells a POS system the following information about a product: the manufacturer, the product family, the discount amount, and, when the coupon is good, the number of what products that have to be purchased to get the savings, etc. The circular can be any type of printed publication containing product offers (i.e., coupons) that is distributed to consumers. Exemplary circulars include a newspaper insert, such as an insert in the Sunday newspaper, and an insert in a direct mailing to consumers, etc. Typically GS1 circulars are published and distributed on a weekly basis. However, embodiments of the present invention are not limited to weekly publications/distributions. Embodiments of the present invention are intended to include all GS1 circulars, regardless of type and/or frequency of publication/distribution.

The DPN system 20 obtains and stores GS1 information from various retailer publications, such as weekly circulars (Block 602). The DPN system 20 may obtain this information in various ways including, but not limited to, directly from retailers, from publishers of the publications, and/or from sources where the publications are published. The DPN system 20 is configured to obtain this information and convert it to digital form as well as to obtain this information in digital form. The DPN system 20 then compares the product UPCs associated with these retailer publications (i.e., UPCs associated with products offered at a discount by a retailer, or to be offered by the retailer at a future time or time period) with UPCs associated with products having a manufacturer discount associated therewith to identify any matching UPCs (Block 604). In some embodiments, comparing UPCs associated with products having a retailer discount with UPCs associated with products having a manufacturer discount may be based on product and/or retailer preferences set by the user. For example, a user may only be interested in stacking opportunities (i.e., products having both a retailer discount and a manufacturer discount) for particular products and/or particular brands. In addition, or alternatively, a user may only be interested in stacking opportunities for products offered by particular retailers and/or at particular retailer locations.

For each matching UPC, the DPN system 20 then calculates the combined savings of the retailer's discount and the manufacturer's discount for the respective product associated with the matching UPCs (Block 606). The DPN system 20 packages the combined savings information for display via a B2C system 22 (Block 608) and then displays this information via a B2C system 22 user interface, such as user interface 72 of FIG. 7B (Block 610). Typically, an identification of each product having a matching retailer and manufacturer discount is displayed along with a digital coupon (e.g., 73, FIG. 7B). Each digital coupon has a combined value of the retailer discount and the manufacturer discount, and each digital coupon is user-selectable for placement in a digital wallet.

A user can select or clip displayed digital coupons 73 which are then placed in a digital wallet associated with the consumer (Block 612) for later redemption by the consumer at a retailer location. In some embodiments, a consumer can invoke auto-clipping, as described above, such that the DPN system 20 automatically places digital coupons in the consumer's digital wallet for products having both a retailer and manufacturer discount.

Figure 6B:
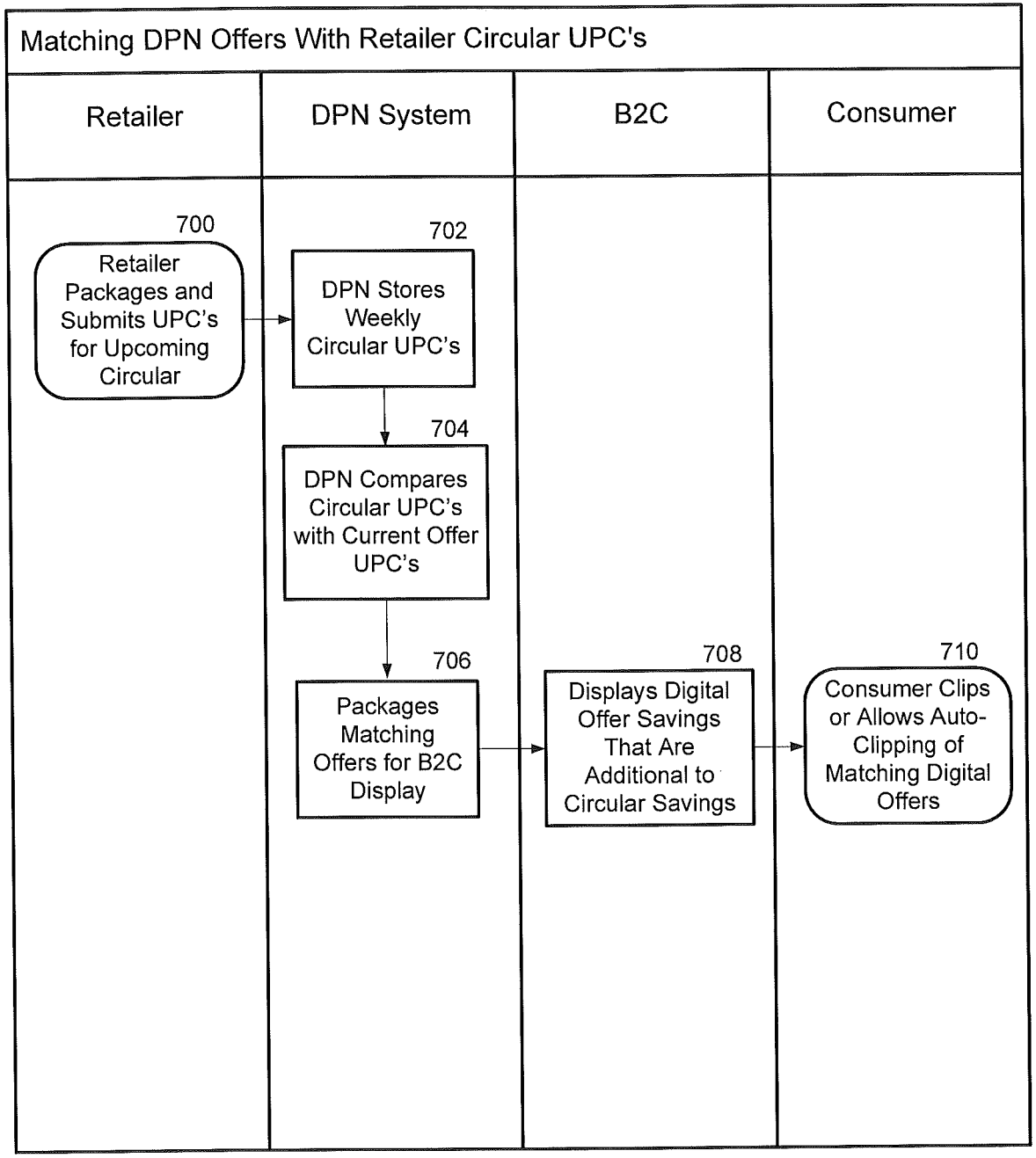

Referring now to FIG. 6B, operations for identifying stacking opportunities and for providing digital coupons to consumers representative of these stacking opportunities, according to some embodiments of the present invention, are illustrated. A retailer packages and submits a plurality of UPCs for publication in an upcoming circular (Block 700). As described above with respect to FIG. 6A, the circular can be any type of printed publication containing product offers (i.e., coupons) that is distributed to consumers. Exemplary circulars include newspaper inserts, such as an insert in the Sunday newspaper, and inserts in direct mailings to consumers, etc. Typically retailer circulars are published and distributed on a weekly basis. However, embodiments of the present invention are not limited to weekly publications/distributions. Embodiments of the present invention are intended to include all types of retailer circulars, regardless of type and/or frequency of publication/distribution.

The DPN system 20 obtains and stores information from various retailer publications, such as weekly circulars (Block 702). The DPN system 20 may obtain this information in various ways including, but not limited to, directly from retailers, from publishers of the publications, and/or from sources where the publications are published. The DPN system 20 is configured to obtain this information and convert it to digital form as well as to obtain this information in digital form. The DPN system 20 then compares the UPCs associated with these retailer publications (i.e., UPCs associated with products offered at a discount by a retailer, or to be offered by the retailer at a future time or time period) with UPCs associated with products having a manufacturer discount associated therewith to identify any matching UPCs (Block 704). In some embodiments, comparing UPCs associated with products having a retailer discount with UPCs associated with products having a manufacturer discount may be based on product and/or retailer preferences set by the user. For example, a user may only be interested in stacking opportunities (i.e., products having both a retailer discount and a manufacturer discount) for particular products and/or particular brands. In addition, or alternatively, a user may only be interested in stacking opportunities for products offered by particular retailers and/or at particular retailer locations.

For each matching UPC, the DPN system 20 packages the combined savings information for display via a B2C system 22 (Block 706) and then displays this information via a B2C system 22 user interface, such as user interface 72 of FIG. 7B (Block 708). Typically, an identification of each product having a matching retailer and manufacturer discount is displayed along with a digital coupon (e.g., 73, FIG. 7B). Each digital coupon has a combined value of the retailer discount and the manufacturer discount, and each digital coupon is user-selectable for placement in a digital wallet.

A user can select or clip displayed digital coupons 73 which are then placed in a digital wallet associated with the consumer (Block 710) for later redemption by the consumer at a retailer location. In some embodiments, a consumer can invoke auto-clipping, as described above, such that the DPN system 20 automatically places digital coupons in the consumer's digital wallet for products having both a retailer and manufacturer discount.

Figure 9:
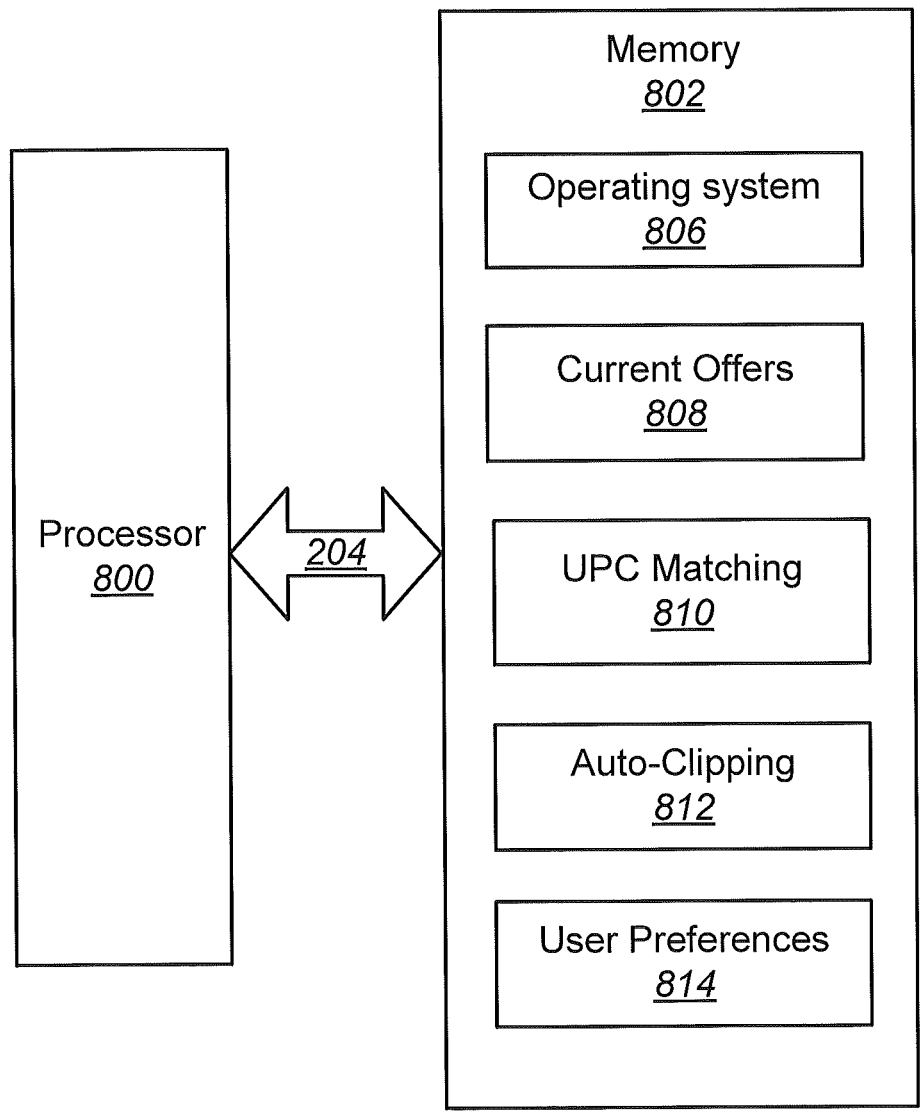
FIG. 9 is a block diagram that illustrates details of an exemplary processor and memory that may be used for providing digital coupons to consumers, according to some embodiments of the present invention.

FIG. 9 illustrates an exemplary processor 800 and memory 802 that may be utilized in implementing various embodiments of the present invention. However, embodiments of the present invention are not limited to a single processor and memory. Multiple processors and/or memory may be utilized, as would be understood by those skilled in the art.

The processor 800 and memory 802 may be utilized to provide digital coupons to consumers based on combined retailer and manufacturer offers, i.e., stacking opportunities. The processor 800 communicates with the memory 802 via an address/data bus 804. The processor 800 may be, for example, a commercially available or custom microprocessor or similar data processing device. The memory 802 is representative of the overall hierarchy of memory devices containing the software and data used to perform the various operations described herein. The memory 802 may include, but is not limited to, the following types of devices: cache, ROM, PROM, EPROM, EEPROM, flash, SRAM, and DRAM.

As shown in FIG. 9, the memory 802 may hold various categories of software and data: an operating system 806, a current offers module 808, a UPC matching module 810, an auto-clipping module 812, and a user preferences module 814. The operating system 806 may manage the resources of one or more devices used to implement embodiments of the present invention and may coordinate execution of various programs (e.g., the current offers module 808, the UPC matching module 810, the auto-clipping module 812, the user preferences module 814, etc.) by the processor 800. The operating system 806 can be any operating system suitable for use with a data processing system, such as IBM®, OS/2®, AIX® or z/OS® operating systems, Microsoft® Windows® operating systems, Android®, Unix or Linux™, etc.

The current offers module 808 comprises logic for identifying and compiling currently available digital coupons offered by product manufacturers and/or retailers, and for communicating these available digital coupons to one or more B2C systems 22 for display to consumers via a communication network 30, such as the Internet. The UPC matching module 810 comprises logic for identifying products offered for sale by a retailer that have both a retailer discount and a manufacturer discount associated therewith. As described above, this is done by comparing UPCs in various retailer circulars with current offers in the DPN system 20 to identify matching UPCs. The UPC matching module 810 also comprises logic for combining the savings of retailer and manufacturer discounts for a product into a digital coupon, and for communicating these digital coupons to one or more B2C systems 22 for display to consumers via a communication network 30, such as the Internet.

The auto-clipping module 812 comprises logic for automatically clipping digital coupons associated with stacking opportunities and for placing these auto-clipped digital coupons in the consumer's digital wallet. The user preferences module 814 comprises logic for allowing consumers to subscribe to the DPN system 20 and to set various preferences. For example, via the user preferences module 814, a consumer can set various preferences regarding auto-clipping and regarding product and/or retailer preferences. For example, via the user preferences module 814, a consumer can specify that the DPN system 20 search for stacking opportunities by product categories, product types, and/or product brands. Moreover, via the user preferences module 814, a consumer can specify that the DPN system 20 search for stacking opportunities at specific retailers and/or at specific retailer locations.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A method of providing a digital coupon to a user for redemption at a point-of-sale (POS) terminal, the method comprising:
 using a processor and a memory coupled thereto to
  store historical purchased product data including corresponding historical purchased product identification codes,
  receive a plurality of coupon identifiers from a plurality of retailers, the plurality of coupon identifiers being associated with products being offered at a discount by the plurality of retailers, each coupon identifier corresponding to a code to be read at the POS terminal, to identify to the POS terminal, coupon information comprising a manufacturer and an amount of the discount,
  associate the plurality of coupon identifiers with a respective first plurality of product identification codes,
  compare the first plurality of product identification codes associated with products being offered at a discount by a given retailer from among the plurality thereof and stored in the memory with a second plurality of product identification codes associated with products being offered at a discount by a manufacturer and stored in the memory,
  display, on a display coupled to the processor, at least one matched product corresponding to matching first and second product identification codes,
  display, on the display, a digital coupon corresponding to each matching product, the digital coupon having a value equal to a sum of the discount by the given retailer and the discount by the manufacturer,
  receive user identification information associated with the user,
  determine whether the user has activated auto-clipping of digital coupons based upon the user identification information,
   when the user has activated auto-clipping of digital coupons, determine whether the user has previously purchased each of the matching products based upon comparing the first and second identification codes to the historical product identification codes for the user based upon the user identification information, and for each of the matching products the user has previously purchased, place a corresponding digital promotion in a digital wallet associated with the user and for redemption at the POS terminal at a retailer location associated with the given retailer, and
   when the user has not activated auto-clipping of digital coupons, permit user-selection via at least one input device coupled to the processor, of the corresponding digital coupon for placement in the digital wallet associated with the user and for redemption at the POS terminal at the retailer location associated with the given retailer,
  obtain at least one purchased product identification code associated with a purchased product during a purchase transaction associated with the user from the POS terminal at the retailer location, and
  determine whether digital coupons in the digital wallet are applicable by comparing the at least one purchased product identification code with one of the first and second product identification codes associated with each matching product and based upon the user identification information.

2. The method of claim 1, further comprising, prior to comparing the first plurality of product identification codes with the second plurality of product identification codes, using the processor to acquire the first plurality of product identification codes from the retailer.

3. The method of claim 1, further comprising, prior to comparing the first plurality of product identification codes with the second plurality of product identification codes, using the processor to acquire the first plurality of product identification codes from at least one publication associated with the retailer.

4. The method of claim 1, wherein the discount by the retailer and the discount by the manufacturer are inactive discounts when the first and second plurality of product identifiers are compared and become active for redemption after a threshold time period from the comparing.

5. The method of claim 1, wherein the first and second plurality of product identification codes comprise a first and second plurality of universal product codes (UPCs).

6. A system for providing a digital coupon to a user for redemption at a point-of-sale (POS) terminal, the system comprising:
 a processor;
 a memory coupled to said processor;
 a display coupled to said processor; and
 at least one input device coupled to said processor;
  said processor being configured to store historical purchased product data including corresponding historical purchased product identification codes,
  receive a plurality of coupon identifiers from a plurality of retailers, the plurality of coupon identifiers being associated with products being offered at a discount by the plurality of retailers, each coupon identifier corresponding to a code to be read at the POS terminal, to identify to the POS terminal, coupon information comprising a manufacturer and an amount of the discount, associate the plurality of coupon identifiers with a respective first plurality of product identification codes, compare the first plurality of product identification codes associated with products being offered at a discount by a given retailer from among the plurality thereof and stored in the memory with a second plurality of product identification codes associated with products being offered at a discount by a manufacturer and stored in the memory, display, on said display coupled to the processor, at least one matched product corresponding to matching first and second product identification codes, display, on said display, a digital coupon corresponding to each matching product, the digital coupon having a value equal to a sum of the discount by the given retailer and the discount by the manufacturer, receive user identification information associated with the user, determine whether the user has activated auto-clipping of digital coupons based upon the user identification information, when the user has activated auto-clipping of digital coupons, determine whether the user has previously purchased each of the matching products based upon comparing the first and second identification codes to the historical product identification codes for the user based upon the user identification information, and for each of the matching products the user has previously purchased, place a corresponding digital promotion in a digital wallet associated with the user and for redemption at the POS terminal at a retailer location associated with the given retailer, and when the user has not activated auto-clipping of digital coupons, permit user-selection via said at least one input device coupled to the processor, of the corresponding digital coupon for placement in the digital wallet associated with the user and for redemption at the POS terminal at the retailer location associated with the given retailer, obtain at least one purchased product identification code associated with a purchased product during a purchase transaction associated with the user from the POS terminal at the retailer location, and determine whether digital coupons in the digital wallet are applicable by comparing the at least one purchased product identification code with one of the first and second product identification codes associated with each matching product and based upon the user identification information.

7. The system of claim 6, wherein said processor is configured to, prior to comparing the first plurality of product identification codes with the second plurality of product identification codes, acquire the first plurality of product identification codes from the retailer.

8. The system of claim 6, wherein said processor is configured to, prior to comparing the first plurality of product identification codes with the second plurality of product identification codes, acquire the first plurality of product identification codes from at least one publication associated with the retailer.

9. The system of claim 6, wherein the first and second plurality of product identification codes comprise a first and second plurality of universal product codes (UPCs).

10. A non-transitory computer readable storage medium for providing a digital coupon to a user for redemption at a point-of-sale (POS) terminal, the non-transitory computer readable storage medium having encoded thereon instructions that, when executed on a processor, cause the processor to perform operations comprising:

storing historical purchased product data including corresponding historical purchased product identification codes;

receiving a plurality of coupon identifiers from a plurality of retailers, the plurality of coupon identifiers being associated with products being offered at a discount by the plurality of retailers, each coupon identifier corresponding to a code to be read at the POS terminal, to identify to the POS terminal, coupon information comprising a manufacturer and an amount of the discount;

associating the plurality of coupon identifiers with a respective first plurality of product identification codes;

comparing the first plurality of product identification codes associated with products being offered at a discount by a given retailer from among the plurality thereof and stored in the memory with a second plurality of product identification codes associated with products being offered at a discount by a manufacturer and stored in the memory;

displaying, on a display coupled to the processor, at least one matched product corresponding to matching first and second product identification codes;

displaying, on the display, a digital coupon corresponding to each matching product, the digital coupon having a value equal to a sum of the discount by the given retailer and the discount by the manufacturer;

receiving user identification information associated with the user;

determining whether the user has activated auto-clipping of digital coupons based upon the user identification information when the user has activated auto-clipping of digital coupons, determine whether the user has previously purchased each of the matching products based upon comparing the first and second identification codes to the historical product identification codes for the user based upon the user identification information, and for each of the matching products the user has previously purchased, place a corresponding digital promotion in a digital wallet associated with the user and for redemption at the POS terminal at a retailer location associated with the given retailer, and when the user has not activated auto-clipping of digital coupons, permitting user-selection via at least one input device coupled to the processor, of the at least one digital coupon for placement in a digital wallet associated with the user and for redemption at the POS terminal at a retailer location associated with the given retailer;

obtaining at least one purchased product identification code associated with a purchased product during a purchase transaction associated with the user from the POS terminal at the retailer location; and determining whether digital coupons in the digital wallet are applicable by comparing the at least one purchased product identification code with one of the first and second product identification codes associated with each matching product and based upon the user identification information.

11. The non-transitory computer readable storage medium of claim 10, wherein the instructions cause the processor to perform operations comprising, prior to comparing the first plurality of product identification codes with the second plurality of product identification codes, acquiring the first plurality of product identification codes from the retailer.

12. The non-transitory computer readable storage medium of claim 10, wherein the instructions cause the processor to perform operations comprising, prior to comparing the first plurality of product identification codes with the second plurality of product identification codes, acquiring the first plurality of product identification codes from at least one publication associated with the retailer.

* * * * *